Jan. 31, 1950 R. F. PEARSON 2,496,105
TELEMETRIC SYSTEM
Filed Jan. 2, 1948 2 Sheets-Sheet 1

INVENTOR.
ROLLAND F. PEARSON
BY
Clark & Ott
ATTORNEYS

Jan. 31, 1950     R. F. PEARSON     2,496,105
TELEMETRIC SYSTEM

Filed Jan. 2, 1948                                   2 Sheets-Sheet 2

INVENTOR.
ROLLAND F. PEARSON
BY
Clark & Ott
ATTORNEYS

Patented Jan. 31, 1950

2,496,105

UNITED STATES PATENT OFFICE 2,496,105

TELEMETRIC SYSTEM

Rolland F. Pearson, Brooklyn, N. Y.

Application January 2, 1948, Serial No. 339

4 Claims. (Cl. 318—23.5)

This invention relates to a telemetric system for operating an indicator at one or more locations in synchronism with a control device.

The invention has in view a telemetric system which is useful for transmitting to distant points information such as orders from the navigating or other officer of aircraft or vessel, the speed of rotating mechanism, readings of instruments and the like.

An object of the invention is to provide a telemetric system which is independent of outside magnetic influences and which is not affected by variations in the earth's magnetic influence.

Still another object of the invention is to provide a telemetric system of the electrical type having a plurality of windings in the field of the control device which are respectively connected in circuit with the cathode and grid of a vacuum tube of the current amplifying type and with the suppressor grid and plate thereof connected in circuit with the coils in the field respectively of a multi-coil rotary indicator.

The invention has for a further object the provision of a rotor having a recessed periphery and a rotor in the form of a permanent magnet constituting the rotating elements in the control and indicating devices, the recessed portion of the rotor of the control device functioning to effect an increased flow of current in the winding adjacent the recessed portion to thereby produce through the respective tube a flow of current in the corresponding winding of the indicator for causing the rotor thereof to align with the magnetic lines of force produced by the flow of current in said coil.

A further object of the invention is to provide a device of the indicated character which is free of moving electrical contacts so as to eliminate any outside magnetic field due to sparking whereby the system is particularly applicable for use in radio and radar control devices.

With the foregoing and other objects in view, reference is now made to the following specification and accompanying drawings in which the preferred embodiments of the invention are illustrated.

In the drawings:

Fig. 2 is a vertical sectional view taken approximately on line 2—2 of the control device of Fig. 1.

Fig. 3 is a similar view taken approximately on line 3—3 of the indicator device of Fig. 1.

Fig. 4 is a view in elevation of the control device.

Fig. 5 is a view in elevation of the indicator device.

Figure 1:
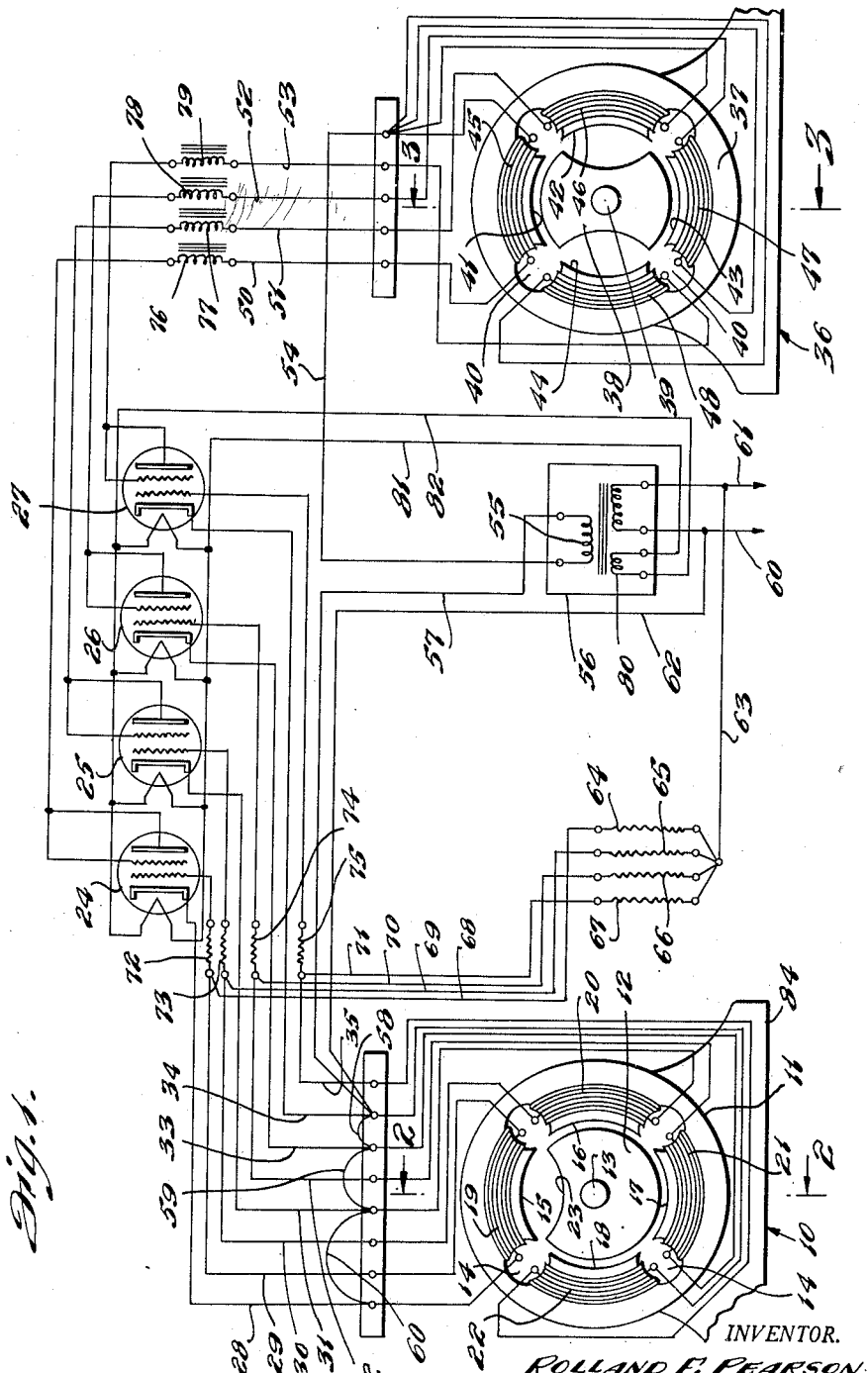
Fig. 1 is a schematic view of a telemetric system constructed in accordance with the invention with the control and indicator devices shown in elevation.

Referring to the drawings by characters of reference, the telemetric system includes a control device 10 consisting of a stator 11 and a rotor 12 journaled for rotation within the stator on a rotatably mounted shaft 13. The stator 11 is formed with a plurality of circumferentially spaced recesses 14 in the inner periphery thereof which sub-divide the inner periphery of the stator into a plurality of arcuately spaced poles 15, 16, 17 and 18. The poles are each provided with a plurality of continuous windings which extend through the recesses 14 and across the opposite ends of the poles forming coils 19, 20, 21 and 22 about the poles respectively for producing magnetic fields flowing through the poles when the coils are connected with a source of alternating current supply.

The inner faces of the poles are concentric with the rotor 12 which is spaced from the poles by a narrow air gap with the exception of an arcuate recessed portion 23 formed in the periphery of the rotor which portion subtends an arc substantially equal to the arcs of the poles respectively. This provides a greater air gap between the face of the recessed portion and the faces of the poles so as to increase the reluctance in the magnetic circuit across said air gap between the rotor and the faces of the poles respectively. The increased reluctance will cause a greater voltage drop across the coil which is adjacent the recessed portion of the rotor and a corresponding increased flow of current in the coil. The voltage drop will gradually increase in the coils respectively as the recessed portion of the rotor approaches radial alignment with the poles respectively and when fully aligned with one of the poles, the coil thereof will have a maximum voltage drop and a maximum flow of current therethrough.

The coils are respectively connected in circuit with the cathode and control grid of vacuum tubes 24, 25, 26 and 27 respectively by conductor wires 28 and 29 leading from the coil 19 to the cathode and control grid of the vacuum tube 24, conductor wires 30 and 31 leading from the ends of the coil 20 to the cathode and control grid of the vacuum tube 25, conductor wires 32 and 33 leading from the ends of the coil 21 to the cathode and control grid of vacuum tube 26 and by conductor wires 34 and 35 leading from the ends of the coil 22 to the cathode and control grid of the vacuum tube 27.

The telemetric system also includes one or more indicators 36 consisting of a stator 37 and a rotor 38 which is journaled for rotation within the stator on a rotatably mounted shaft 39. The stator has its inner periphery provided with circumferentially spaced recesses 40 forming circumferentially spaced poles 41, 42, 43 and 44 corresponding in number and arrangement to the poles 15 to 18 respectively of the stator 11. The poles 41 to 44 inclusive of the stator 37 are provided with coils 45, 46, 47 and 48 similar to the coils 19 to 22 respectively of the stator 11. The coils 45 to 48 inclusive are each connected at one end thereof by conductor wires 50, 51, 52 and 53 with the suppressor grid and plate of the vacuum tubes 24 to 27 respectively while the opposite end of said coils are each connected by a common wire 54 to one end of a secondary winding 55 of a transformer 56.

The opposite end of the secondary winding of the transformer 56 is connected by a conductor wire 57 to the conductor wire 34 and by jumper wires 58, 59 and 60 with the conductor wires 33, 31 and 28 respectively. The primary winding of the transformer 56 is connected with a source of alternating current supply by conductor wires 60 and 61, the conductor wire 60 being connected by a conductor wire 62 to the conductor wire 34 and by said jumper wires to the conductor wires 33, 31 and 28. The opposite conductor wire 61 leading from the primary of the transformer 56 is connected by a conductor wire 63 to current limiting resistances 64, 65, 66 and 67 which are arranged in parallel and respectively connected by conductor wires 68, 69, 70 and 71 with the conductor wires 29, 30, 32 and 35.

In order to prevent the flow of current from the source of supply to the control grids of the tubes respectively current blocking resistances 72, 73, 74 and 75 are arranged in said circuit between the juncture of the conductor wires 68, 69, 70 and 71 with the conductor wires 29, 30, 32 and 35 respectively and the control grids of the vacuum tubes 24, 25, 26 and 27.

The conductor wires 50, 51, 52 and 53 are each provided with reactance coils 76, 77, 78 and 79 respectively which function to smooth out the pulsations in the current flowing from the plate to the coils 45, 46, 47 and 48 respectively. The transformer 56 is also provided with a secondary winding 80 which is connected by conductor wires 81 and 82 with the filaments of the tubes respectively.

By this construction and arrangement current from the source of supply will flow through adjacent coils 19, 20, 21 and 22 of the stator 11 in opposite directions. When the rotor 12 of the control device 10 is located with the recess 23 thereof disposed in radial alignment with the pole 15, a maximum voltage drop will occur across the coil thereof with a consequent maximum flow of current through said coil. This will produce a maximum voltage drop on the control grid thereby causing a maximum flow of current to the plate of the tube 24 and thence to the coil 45 of the indicator 36. From the coil 45 the current will flow through the conductor wire 54 and to the secondary winding of the transformer 56 and from the opposite end of the secondary winding of the transformer 56 through the conductor wire 57 and the jumper wires to the conductor wire 28 and thence to the cathode of the tube 24.

The rotor 38 of the indicator 36 is recessed on opposite sides with arcuate peripheral face portions arranged between said recesses, which face portions are formed concentrically with the inner faces of the poles of the stator 37 and are spaced therefrom to provide a narrow air gap therebetween. The rotor is permanently magnetized so that the ends thereof will be of opposite polarity. The flow of current in the coils respectively of the indicator 36 will set up magnetic fields which will attract the rotor and cause the same to align with the lines of force passing through the poles. Thus when the coil 45 has the maximum flow of current therethrough the rotor 38 will be rotated as indicated to a position in radial alignment with the pole 41 corresponding to the radial position of the recess 23 of the rotor 12 of the control device 10. In like manner, movement of the rotor 12 to any position so as to cause a voltage drop across any one of the coils 19, 20, 21 and 22 or across any two adjacent coils thereof will produce a flow of current in the corresponding coil or coils in the indicator so as to effect movement of the rotor 38 to a position in alignment with the rotor 12 or in which the end indicated as of north polarity is located in the same position as the recess 23 of the rotor 12.

The stator 11 and rotor 12 of the control device 10 are each made up of laminated sheet iron stampings which are secured together in any desired manner. The stator 11 is affixed to a base 84 which is provided with spaced upstanding posts 85 in which the shaft 13 of the rotor 12 is journaled for rotation. An operating handle 86 is affixed to the outer end of the shaft 13 for manually turning the rotor 12 so as to set the same in any desired position. For this purpose, the handle is provided with a spring pressed detent 87 disposed in radial alignment with a peripherally notched annulus 88 affixed to a panel 89 in surrounding relation with the shaft 13. The panel 89 is affixed to the base 84 and is provided on the outer face thereof with a dial 90 graduated in 360 degrees and in revolutions per minute or other indicia so that the handle 86 may be turned to set the rotor 12 to indicate by the location of the handle thereof the reading on the dial corresponding to the information or message to be transmitted to a distant point and which will be correspondingly indicated on the indicator 36.

The stator 37 and rotor 38 of the indicator 36 are similarly made up of laminated sheet iron stampings which are secured together in any desired manner. The stator 37 is affixed to a base 92 which is provided with spaced upstanding posts 93 in which the shaft 39 of the rotor is mounted for rotation. The stator is provided with a pointer 94 secured to the outer end thereof in overlying relation with a dial 95 affixed to a panel 96 secured to the side of the base 92. The dial 95 is graduated in degrees and revolutions per minute or other indicia corresponding to the graduations on the dial 90 of the control device 10 whereby the movement of the rotor 38 controlled by the movement of the rotor 12 of the control device will effect movement of the pointer 94 to correspond with the setting of the operating handle 86.

What is claimed is:

1. In a telemetric system, a control device including a stator having a plurality of poles with independent coils for producing a magnetic field passing through the poles respectively, a rotor mounted for rotation within said stator and having a recess in the periphery thereof subtended by an arc substantially equal to the arc subtended by the poles respectively, a responsive device including a stator having poles corresponding in number to the poles of the control device and respectively provided with coils for producing a magnetic field passing through each of the poles, a permanent magnet mounted for rotation in said stator and having opposite ends formed concentric with said poles, vacuum tubes corresponding in number to the number of poles of the stator of said control device, said tubes having their cathodes and control grids connected with the opposite ends of the coils of the stator of said control device respectively and the suppressor grids and plates of said tubes being connected with the coils of the responsive device respectively at one end thereof, a transformer adapted to be connected with a source of alternating current supply and having a secondary winding connected in circuit with each of the coils of said responsive device and in circuit with each of the coils of the control device for producing a magnetic field in the stator of the responsive device to cause the permanent magnet to be rotated to a position corresponding to any setting of the rotor of the control device.

2. In a telemetric system, a control device including a stator having a plurality of poles with independent coils for producing a magnetic field passing through the poles respectively, a rotor mounted for rotation within said stator and having a recess in the periphery thereof subtended by an arc substantially equal to the arc subtended by the poles respectively, a responsive device including a stator having poles corresponding in number to the poles of the control device and respectively provided with coils for producing a magnetic field passing through each of the poles, a permanent magnet mounted for rotation in said stator and having opposite ends formed concentric with said poles, vacuum tubes corresponding in number to the number of poles of the stator of said control device, said tubes having their cathodes and control grids connected with the opposite ends of the coils of the stator of said control device respectively and the suppressor grids and plates of said tubes being connected with the coils of the responsive device respectively at one end thereof, the coils of said control device and the coils of said indicator device each being in circuit for connection with a source of current supply for directing the current through adjacent coils of the stator of the control device in opposite directions and through the coils of the stator of the responsive device uniformly in the same direction for producing a magnetic field in the stator of the responsive device to cause the permanent magnet to be rotated to a position corresponding to any setting of the rotor of the control device.

3. In a telemetric system, a control device including a stator having a plurality of arcuately spaced poles and independent coils thereon for producing a magnetic field passing through the poles respectively, a rotor mounted for rotation within said stator and having a recess in the periphery thereof for providing an enlarged air gap between the face of the recessed portion and the periphery of the poles, a responsive device including a stator having poles corresponding in number to the poles of the control device and respectively provided with coils for producing a magnetic field passing through each of the poles, a permanent magnet mounted for rotation in said stator, vacuum tubes corresponding in number to the number of poles of the stator of said control device, said tubes having their cathodes and control grids connected respectively with the opposite ends of the coils of the stator of said control device and the suppressor grids and plates of said tubes connected with the coils respectively of the responsive device at one end thereof to provide an increased flow of current through the coil of the stator of the control device disposed in radial alignment with the recess in the rotor thereof and a maximum voltage drop on the control grid of the tube in circuit with said coil to thereby cause an increased flow of current through the coil of the stator of the responsive device in circuit with the suppressor grid and plate of said tube to set up a magnetic field in the stator of said responsive device to cause the permanent magnet to be rotated to a position corresponding to any setting of the rotor of the control device.

4. In a telemetric system, a control device including a stator having a plurality of poles with independent coils for producing a magnetic field passing through the poles respectively, a rotor mounted for rotation within said stator and having a recess in the periphery thereof subtended by an arc substantially equal to the arc subtended by the poles respectively, a responsive device including a stator having poles corresponding in number to the poles of the control device and respectively provided with coils for producing a magnetic field passing through each of the poles, a permanent magnet mounted for rotation in said stator and having opposite ends formed concentric with said poles, vacuum tubes corresponding in number to the number of poles of the stator of said control device, said tubes having their cathodes and control grids connected with the opposite ends of the coils of the stator of said control device respectively and the suppressor grids and plates of said tubes being connected with the coils of the responsive device respectively at one end thereof, a transformer adapted to be connected with a source of alternating current supply and having a secondary winding connected in circuit with each of the coils of said responsive device and in circuit with each of the coils of the control device to provide an increased flow of current through the coil of the stator of the control device disposed in radial alignment with the recess in the rotor thereof and a maximum voltage drop on the control grid of the tube in circuit with said coil to thereby cause an increased flow of current through the coil of the stator of the responsive device in circuit with the suppressor grid and plate of said tube to set up a magnetic field in the stator of said responsive device to cause the permanent magnet to be rotated to a position corresponding to any setting of the rotor of the control device.

ROLLAND F. PEARSON.

REFERENCES CITED

The following references are of record in the file of this patent:

UNITED STATES PATENTS

| Number | Name | Date |
|---|---|---|
| 1,564,788 | Hildebrand | Dec. 8, 1925 |
| 1,576,195 | Junken | Mar. 9, 1926 |
| 1,607,917 | Rowland | Nov. 23, 1926 |
| 2,379,417 | Conrad | July 3, 1945 |